C. C. ABBOTT.
RESETTING TOOL FOR COUNTERS.
APPLICATION FILED JAN. 6, 1913.
1,068,091.
Patented July 22, 1913.
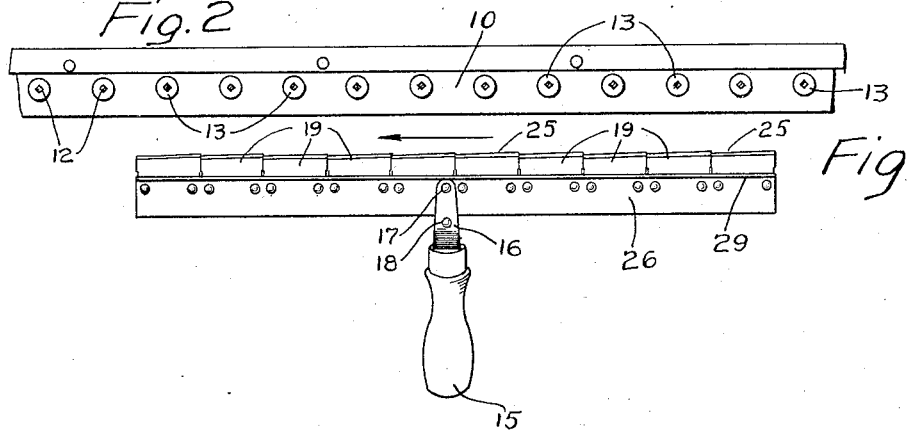
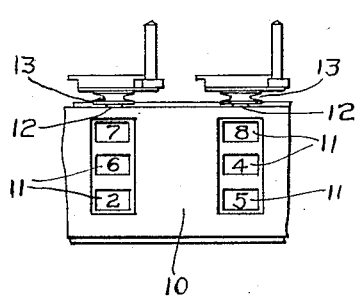
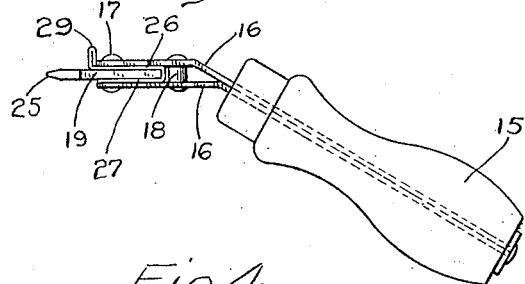
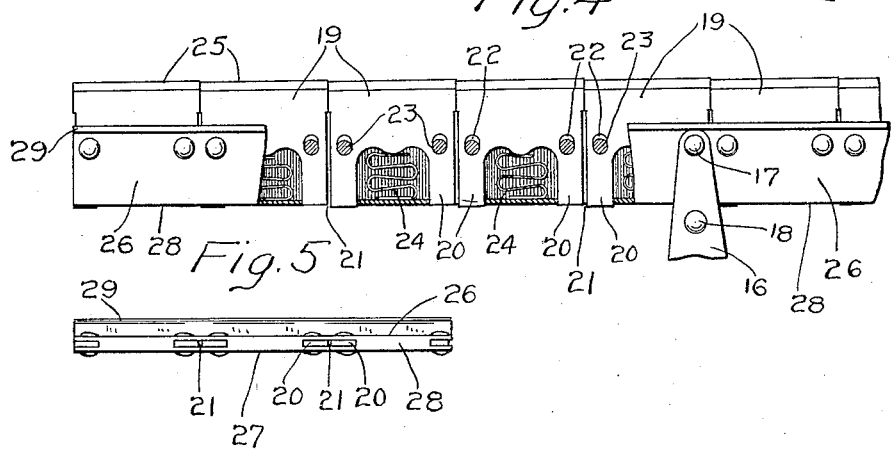
WITNESSES:
H. W. Meade
S. W. Atherton
INVENTOR
Charles C. Abbott
BY
A. M. Wooster
ATTORNEY

UNITED STATES PATENT OFFICE.

CHARLES C. ABBOTT, OF PITTSFIELD, MASSACHUSETTS, ASSIGNOR TO TRIUMPH VOTING MACHINE COMPANY, OF PITTSFIELD, MASSACHUSETTS, A CORPORATION OF NEW JERSEY.

RESETTING-TOOL FOR COUNTERS.

1,068,091.  Specification of Letters Patent.  Patented July 22, 1913.

Application filed January 6, 1913. Serial No. 740,424.

*To all whom it may concern:*

Be it known that I, CHARLES C. ABBOTT, a citizen of the United States, residing at Pittsfield, county of Berkshire, State of Massachusetts, have invented an Improvement in Resetting-Tools for Counters, of which the following is a specification.

This invention relates to tools for use particularly in connection with the counters of voting machines and has for its object to provide a simple tool or implement by which the counters may be easily and quickly reset for another election after the votes in one election have all been cast, the counters read, and the result recorded.

With this end in view I have devised the novel implement which I will now describe, reference being had to the accompanying drawing forming a part of this specification and in which:

Figure 1 is a plan view of the tool complete and Fig. 2 a similar view of a line of counters, Figs. 1 and 2 collectively illustrating the coöperation of the tool with the counters; Fig. 3 is an enlarged end elevation of the tool; Fig. 4 is an enlarged plan view of a portion of the tool, partly broken away to show the interior construction; Fig. 5 is a rear elevation of certain parts shown in Fig. 4; Fig. 6 is an enlarged front elevation of a part of the counter carrying bar.

The voting mechanism of the voting machine in connection with which the implement is used forms no part of the present invention, but the tool herein shown is particularly adapted for use in connection with the counters of voting machines of the general type shown and described in Letters Patent Nos. 914,006 and 999,621, granted to me March 2, 1909, and August 1, 1911, respectively. For the purposes of the present description it will be sufficient to say that such voting machines comprise a plurality of voting members, which are operated by the voter to indicate his choice, and a counter grid or carrier upon which are arranged a plurality of counters. The counters correspond in number and arrangement with the voting members and are engaged thereby when said voting members are operated. When the voter leaves the machine the counter grid is actuated, and all counters which have been engaged by voting members are operated to register a vote.

Referring to the drawing, 10 denotes one of the counter bars of the counter grid, each of which bars carries a series of counters. The construction of the counter bars and counters forms no part of the present invention, but for convenience these parts are shown as substantially the same as the corresponding parts in my application Serial No. 740,422, filed Jan. 6, 1913. The counters may be of any ordinary or preferred form, the only essential features thereof being a series of number wheels or indicators 11, a shaft 12 by which said indicators are operated, and a friction wheel 13 secured to the shaft 12, said wheel as herein shown being provided with an angular groove. In my application Serial No. 740,422, above referred to, means are described whereby when the counter shafts are turned backwardly each counter will be automatically stopped when the indicators thereof are all in the position to register zero and further retrograde movement prevented. This mechanism, however, forms no part of the present invention and is not shown herein.

The tool forming the subject matter of the present invention comprises a straight, elongated, and substantially rigid body portion which is preferably formed of a strip of sheet metal bent upon itself to form upper and lower flanges 26 and 27 and a back 28, as shown most clearly in Fig. 3. The top flange 26 as shown is preferably provided at its edge with a rib 29, which, by engagement with the top of the counter bar prevents the tool from being used wrong side up.

15 denotes a handle provided with arms 16 which embrace the body portion and are pivoted thereto by means of a pin 17. For convenience in use the arms 16 are preferably bent to cause the handle 15 to lie at an angle to the body portion in a direction transversely thereof, or to be downwardly inclined with respect thereto, as clearly shown in Fig. 3.

18 denotes a stop pin extending between the arms 16 and riveted thereto, said pin being arranged to engage the back 28 of the body portion and limit the movement of the handle on its pivot.

19 denotes friction shoes of which a series is carried by the body portion at its forward, longitudinally extending edge. Said friction shoes are arranged for a limited sliding movement between the upper and lower flanges 26 and 27. To this end said friction shoes are formed at their rear ends with arms 20 which slide in slots 21 in the back 28 of the body portion and with short slots 22 in which are located pins 23 extending between the upper and lower flanges of the body portion and riveted thereto. Preferably the pivot pin 17 will take the place of one of the pins 23. Said friction shoes are normally held in their outermost positions by means of springs 24 interposed between the friction shoes and the back 28 of the body portion and occupying the recesses between the arms 20. The outer edges 25 of the friction shoes are preferably beveled, as shown most clearly in Fig. 3, so as substantially to fit the angular grooves in the friction wheels 13 of the counters. As shown in Figs. 1 and 4, one end of the edge of each friction shoe, herein the right end, extends slightly farther from the body portion than the adjacent end of the next shoe in the series, the edges 25 being correspondingly inclined, for a purpose which will presently appear. The length of each friction shoe 19 is preferably slightly less than the distance between centers of the counter shafts 12.

In operation the resetting tool is placed with the edges 25 of the friction shoes in engagement with the grooves in the friction wheels 13 and moved longitudinally of the counter bar 10 toward the left, as shown by the arrow adjacent Figs. 1 and 2. This causes the counter shafts of the line of counters so engaged to be simultaneously turned in the direction to cause the counters to be reset. This operation of the resetting tool is repeated until all of the indicators of all of the counters register zero. It will be understood that as each counter reaches the zero position it will preferably be stopped in this position by the mechanism above referred to, so that further operation of the resetting tool, in order to reset the other counters in the same row, merely causes the friction shoes to slip idly over the friction wheels of such counters as have been fully reset. By reason of the fact that the friction shoes are movably and yieldingly mounted in the body portion of the tool, they will be caused properly to engage all of the friction wheels of the row of counters as the tool is moved, even though the alinement of the counter shafts in the counter bar is not perfect. The inclination of the edges 25 of the friction shoes prevents the corners of these shoes from interfering with the free movement of the tool. By reason of the pivotal mounting of the handle 15, the body portion 14 may be conveniently held with the edges of all of the friction shoes in engagement with the friction wheels as the tool is moved along the row of counters.

Having thus described my invention I claim:

1. A resetting tool for counters comprising a straight, substantially rigid body portion provided at its edge with means for frictionally engaging the counters, a handle pivoted to said body portion, and means for limiting the movement of said handle on its pivot.

2. A resetting tool for counters comprising a straight, substantially rigid body portion provided at its edge with means for frictionally engaging the counters, a handle pivoted to said body portion, and a pin carried by said handle and adapted to engage said body portion to limit the movement of the handle on its pivot.

3. A resetting tool for counters comprising a body portion provided at its edge with means for frictionally engaging the counters and a handle having a pair of arms embracing said body portion and pivoted thereto.

4. A resetting tool for counters comprising a body portion provided at its edge with means for frictionally engaging the counters, a handle having a pair of arms embracing said body portion and pivoted thereto, and a pin connecting said arms and adapted to engage said body portion to limit the movement of the handle on its pivot.

5. A resetting tool for counters comprising an elongated body portion provided at its edge with means for frictionally engaging the counters, said body portion having a handle arranged at an angle thereto in a direction transversely thereof.

6. A resetting tool for counters comprising an elongated body portion provided at its edge with means for frictionally engaging the counters and a handle pivoted to said body portion and arranged at an angle thereto in a direction transversely.

7. A resetting tool for counters comprising an elongated body portion provided at one of its longitudinally extending edges with a series of friction shoes, said shoes being each of a length slightly less than the distance between the centers of the counters.

8. A resetting tool for counters comprising a body portion provided with a series of friction shoes slidably mounted therein.

9. A resetting tool for counters comprising an elongated body portion provided at one of its longitudinally extending edges with a series of friction shoes slidably mounted therein.

10. A resetting tool for counters comprising a body portion provided with a series of pins and a series of friction shoes mounted to slide on said pins.

11. A resetting tool for counters comprising a body portion provided with a series of slots and a series of friction shoes having arms which slide in said slots.

12. A resetting tool for counters comprising a body portion provided with a series of pins and a series of slots, and a series of friction shoes mounted to slide on said pins and having arms which slide in said slots.

13. A resetting tool for counters comprising a body portion provided with a series of spring pressed friction shoes.

14. A resetting tool for counters comprising an elongated body portion provided at one of its longitudinally extending edges with a series of spring pressed friction shoes.

15. A resetting tool for counters comprising a body portion provided with a series of friction shoes slidably mounted therein, and springs interposed between said shoes and body portion.

16. A resetting tool for counters comprising an elongated body portion provided at one of its longitudinally extending edges with a series of friction shoes slidably mounted therein, springs interposed between said shoes and body portion, a handle pivoted to said body portion, and means for limiting movement of said handle on its pivot.

17. A resetting tool for counters comprising a body portion, a series of friction shoes mounted in said body portion and having recesses, and springs in said recesses and engaging said body portion.

18. A resetting tool for counters comprising a body portion provided with a series of slots, a series of friction shoes having arms which slide in said slots, and springs interposed between said shoes and body portion and lying between said arms.

19. A resetting tool for counters comprising a body portion provided with a series of pins and a series of slots, a series of friction shoes mounted to slide on said pins and having arms which slide in said slots, springs interposed between said shoes and body portion and lying between said arms, a handle having a pair of arms embracing said body portion and pivoted thereto, and a pin connecting the arms of said handle and adapted to engage said body portion to limit the movement of said handle on its pivot.

20. A resetting tool for counters comprising a straight, substantially rigid body portion provided with a series of friction shoes independently mounted therein.

21. A resetting tool for counters comprising a body portion provided with a series of friction shoes having beveled edges.

22. A resetting tool for counters comprising a body portion, a series of friction shoes having beveled edges and slidably mounted in said body portion, and springs interposed between said shoes and body portion.

23. A resetting tool for counters comprising a body portion provided at its edge with a series of independently mounted friction shoes, said friction shoes having inclined edges and the end of the edge of each shoe projecting beyond the adjacent end of the next shoe in the series.

24. A resetting tool for counters comprising a body portion provided with a series of friction shoes slidably mounted therein, and springs interposed between said shoes and body portion, said shoes having inclined edges and the end of the edge of each shoe projecting beyond the adjacent end of the next shoe in the series.

25. A resetting tool for counters comprising a body portion provided at its edge with a series of independently mounted friction shoes, said friction shoes having beveled and inclined edges and the end of the edge of each shoe projecting beyond the adjacent end of the next shoe in the series.

26. A resetting tool for counters comprising a body portion provided with a series of slots, a series of friction shoes having arms which slide in said slots, and springs interposed between said shoes and body portion and lying between said arms, said friction shoes having beveled and inclined edges and the end of the edge of each shoe projecting beyond the adjacent end of the next shoe in the series.

27. A resetting tool for counters comprising a body portion provided at its edge with means for frictionally engaging the counters and at one side with a projecting rib.

In testimony whereof I affix my signature in presence of two witnesses.

CHARLES C. ABBOTT.

Witnesses:
ANNA F. DOWNS,
MARTIN P. KERNASHAN.

Copies of this patent may be obtained for five cents each, by addressing the "Commissioner of Patents, Washington, D. C."